United States Patent [19]

Naito

[11] Patent Number: 6,017,465
[45] Date of Patent: Jan. 25, 2000

[54] LIQUID CRYSTAL DISPLAY ELEMENT

[75] Inventor: Katsuyuki Naito, Tokyo, Japan

[73] Assignee: Kabushiki Kaisha Toshiba, Kawasaki, Japan

[21] Appl. No.: 08/614,539

[22] Filed: Mar. 13, 1996

[30] Foreign Application Priority Data

Mar. 16, 1995 [JP] Japan ................................. 7-056884

[51] Int. Cl.[7] .......................... C09K 19/52; C09K 19/32; G02F 1/13

[52] U.S. Cl. ................. 252/299.01; 252/299.62; 349/182

[58] Field of Search ................. 252/299.01, 299.62; 349/182

[56] References Cited

U.S. PATENT DOCUMENTS

| | | | |
|---|---|---|---|
| 4,435,047 | 3/1984 | Fergason . | |
| 4,898,755 | 2/1990 | Che et al. | 427/389.7 |
| 5,116,528 | 5/1992 | Mullen et al. | 252/299.5 |
| 5,188,760 | 2/1993 | Hikmet et al. | 252/299.01 |
| 5,194,183 | 3/1993 | Munch et al. | 252/586 |
| 5,427,828 | 6/1995 | Park | 428/1 |
| 5,508,068 | 4/1996 | Nakano et al. | 428/1 |
| 5,514,296 | 5/1996 | Chen et al. | 252/299.01 |
| 5,531,925 | 7/1996 | Landh et al. | 252/299.01 |
| 5,543,267 | 8/1996 | Stumpe et al. | 430/290 |
| 5,645,758 | 7/1997 | Kawasumi et al. | 252/299.01 |
| 5,766,508 | 6/1998 | Kawasumi et al. | 252/299.01 |
| 5,766,509 | 6/1998 | Kawata et al. | 252/299.01 |
| 5,766,518 | 7/1998 | Ishii | 252/582 |
| 5,783,114 | 7/1998 | Dyer et al. | 252/582 |
| 5,869,420 | 2/1999 | Naito | 503/201 |

FOREIGN PATENT DOCUMENTS

| | | |
|---|---|---|
| 58-501631 | 9/1983 | Japan . |
| 61-502128 | 9/1986 | Japan . |
| 63-98631 | 4/1988 | Japan . |
| 2-83534 | 3/1990 | Japan . |

*Primary Examiner*—C. H. Kelly
*Attorney, Agent, or Firm*—Oblon, Spivak, McClelland, Maier & Neustadt, P.C.

[57] ABSTRACT

A liquid crystal display element including a pair of substrates each having an electrode, arranged so that the electrodes face to each other, and a liquid crystal layer sandwiched between the pair of substrates and containing a mixture of a low-molecular compound which forms an amorphous phase or which forms a network, and a liquid crystal substance.

12 Claims, 4 Drawing Sheets

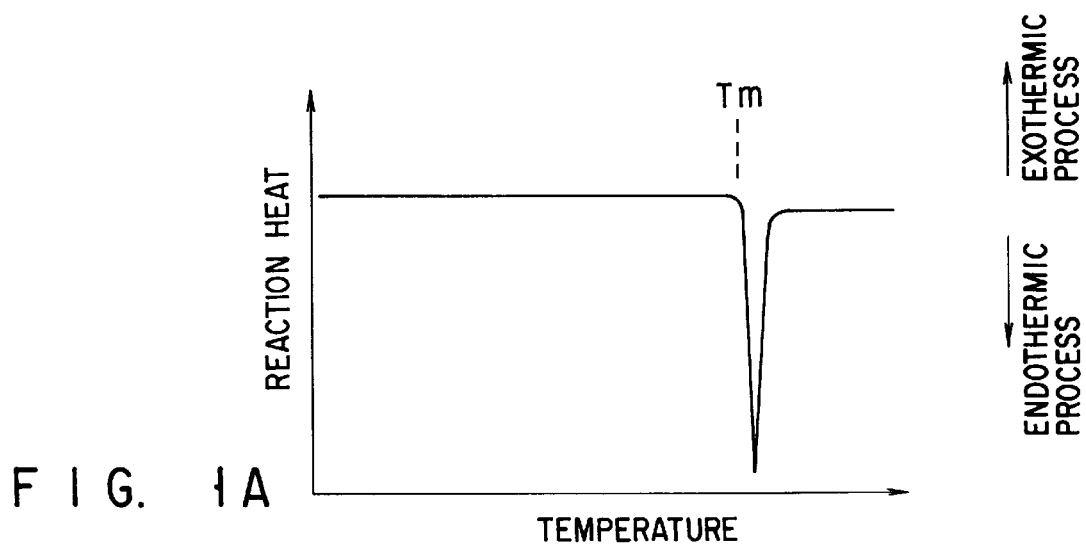
F I G. 1A
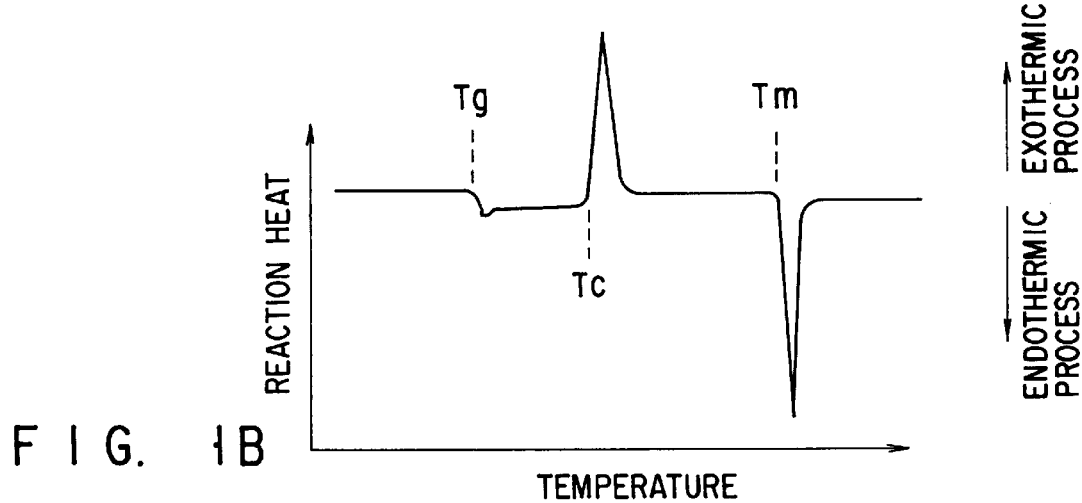
F I G. 1B
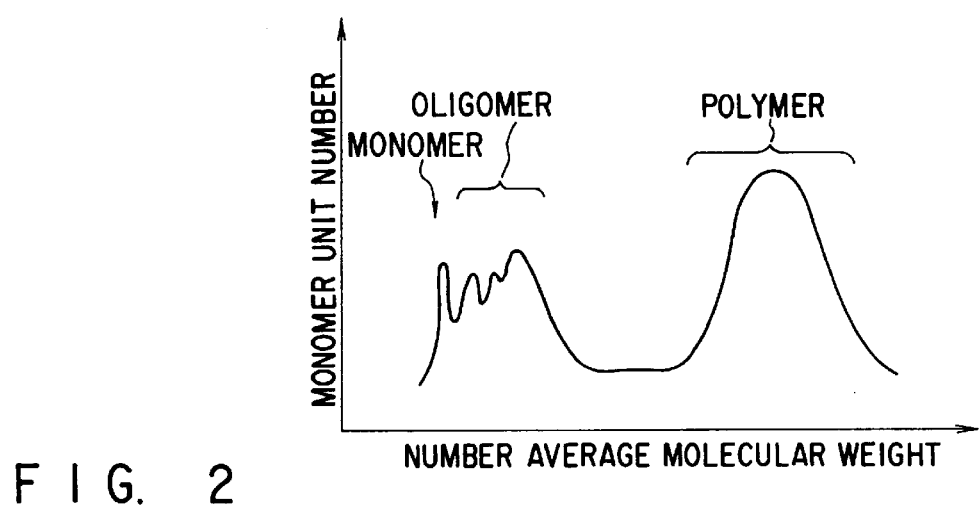
F I G. 2

LIQUID CRYSTAL DISPLAY ELEMENT

BACKGROUND OF THE INVENTION

1. Field of the Invention

The present invention relates to a liquid crystal display element.

2. Description of the Related Art

Conventionally, a TN (twisted namatic) liquid crystal display element which employs nematic liquid crystal or an STN (super twisted nematic) liquid crystal display element is practically used as a liquid crystal display element. Further, a liquid crystal display element which employs ferroelectric liquid crystal is conventionally proposed. However, in order to manufacture an element using any of the above-mentioned types of liquid crystals, it is necessary to carry out an alignment process and the like, and therefore a large-size element cannot be easily manufactured.

In the meantime, as disclosed in Jpn. Pat. Appln. KOKAI Publication No. 58-501632 or U.S. Pat. No. 4,435,047, a method of forming a liquid crystal layer by dispersing a capsulated liquid crystal droplet in polyvinyl alcohol, is known as a technique for manufacturing a large-size and low-cost liquid crystal display element without carrying out such an alignment process. With regard to elements obtained by the above method, in those elements whose liquid crystal molecules exhibit a positive dielectric anisotropy in a thin film, the liquid crystal molecules are arranged in the direction of an electric field when such an electrical field is applied. In this case, if the refractive index $n_o$ of the liquid crystal and the refractive index $n_p$ of the polymer are equal to each other, the liquid crystal layer becomes transparent. When the electrical field is removed, the liquid crystal molecules are set back in a random orientation, and a difference is created between the refractive indexes $n_o$ and $n_p$ of the liquid crystal droplet. Therefore, liquid crystal droplets scatter light as being reflected on their interfaces and the liquid crystal layer is made opaque in white.

Other than those described above, some other techniques for dispersing liquid crystals in polymer are known. For example, Jpn. Pat. Appln. KOKAI Publication No. 61-502128 discloses the dispersion of liquid crystals in epoxy resin, and Jpn. Pat. Appln. KOKAI Publication No. 2-83534 discloses the dispersion of liquid crystals in urethaneacrylate resin. Further, Jpn. Pat. Appln. KOKAI Publication No. 63-98631 discloses a liquid crystal display element having a parallel beam supplying section and a selective light transmitting section in its capsule liquid crystal section, as means for improving the contrast of the element.

These so-called polymer dispersion type liquid crystal entails the following advantages. That is, (1) No polarizing plate is required and therefore a bright image can be formed. (2) A wide viewing angle can be obtained. (3) Since the alignment process for the liquid crystal is not required, the creation of dust, the generation of static electricity and the like, which may result in the rubbing step, can be avoided. (4) As compared to the conventional liquid crystal display element in which liquid crystal is packed between substrates and sealed, the polymer dispersiontype liquid crystal element has a simple structure, and it can be easily increased in size.

However, at the same time, the polymer dispersion type liquid crystal display element entails the following disadvantages.

First, the disadvantages with regard to the manufacture thereof will be listed. A polymer dispersion liquid crystal display element is manufactured in the following fashion. That is, a thermosetting or photo-setting liquid resin in which liquid crystal substances are dispersed or dissolved, is poured inside a cell formed of two substrates having electrodes, and then the liquid resin is hardened by irradiation of heat or light, so as to obtain a solid resin in which liquid crystal droplets are dispersed.

Therefore, with this method, (1) due to a slight difference in the conditions of the irradiation of heat or light, the size or shape of the liquid crystal droplets is changed, and the operating voltage or the contrast of the product display element is rendered different from one case to another. Further, (2) since the resin is hardened, it is impossible to recover defects once the manufacture of the element is completed, whereas in the case of a TN or STN liquid crystal display element, it is still possible to recover alignment errors or the like by annealing after the element has been manufactured.

Next, the disadvantages in terms of electroptics will now be discussed. (1) When a voltage is applied to the liquid crystal display element, a hysteresis occurs. As a result, with the polymer dispersion liquid crystal display element, it is impossible to display a half-tone.

Recently, there has been a report on a lightscattering liquid crystal element which entails the advantages of the polymer dispersion liquid crystal and removes the above-described disadvantages. More specifically, Jpn. Pat. Appln. KOKAI Publication No. 5-216015 discloses a liquid crystal display element having a mixture material in a gel state, as a structural element, which contains a compound having a perfluoroalkyl group, and a liquid crystal substance.

This display element entails the following advantages. (1) It is possible to display without hysteresis. This is because a model of stepwise deformation of the liquid crystal within a liquid crystal droplet, which is the main cause for the hysteresis, is not established. (2) A contrast as high as that of a TN liquid crystal cell, that is, 1:50 to 1:80, can be realized. More specifically, as compared to an ordinary polymer dispersion liquid crystal, the scattering of light is increased when a voltage is not applied. Therefore, the light shading property is improved, and the contrast is increased. (3) $V_{th}$ is 2 to 4 V, and the element can be driven at a voltage as low as that of a TN liquid crystal cell.

However, even a liquid crystal display element which employs a compound containing a perfluoroalkyl group, entails the following disadvantages. The compound containing a perfluoroalkyl group has a low molecular weight, and therefore this liquid crystal display element has, for example, a low film forming ability and a low long-term stability of the phase separation state, as compared to the liquid crystal display element which employs a polymer dispersion liquid crystal.

SUMMARY OF THE INVENTION

The present invention has been proposed under the above-described circumstances, and the object of the invention is to provide a liquid crystal display element having the same advantages as those of the conventional liquid crystal display element which employs a compound containing a perfluoroalkyl group, and having a high film-forming ability and a high long-term stability of the phase separation state.

The above object can be achieved by a liquid crystal display element including: a pair of substrates each having an electrode, arranged so that the electrodes face to each other; and a liquid crystal layer sandwiched between the pair of substrates and containing a mixture material of a low-molecular weight compound which forms an amorphous phase, and a liquid crystal substance.

Further, the above object can be also achieved by a liquid crystal display element including: a pair of substrates each having an electrode, arranged so that the electrodes face to each other; and a liquid crystal layer sandwiched between the pair of substrates and containing a mixture material of a low-molecular weight compound which forms a network, and a liquid crystal substance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A and 1B are graphs showing general heat characteristics of a low-molecular weight compound of the present invention, measured by a differential scanning calorimeter;

FIG. 2 is a graph showing a distribution of molecular weights of polymers in polymer dispersion liquid crystal;

DETAILED DESCRIPTION OF THE PREFERRED EMBODIMENTS

Figure 3:
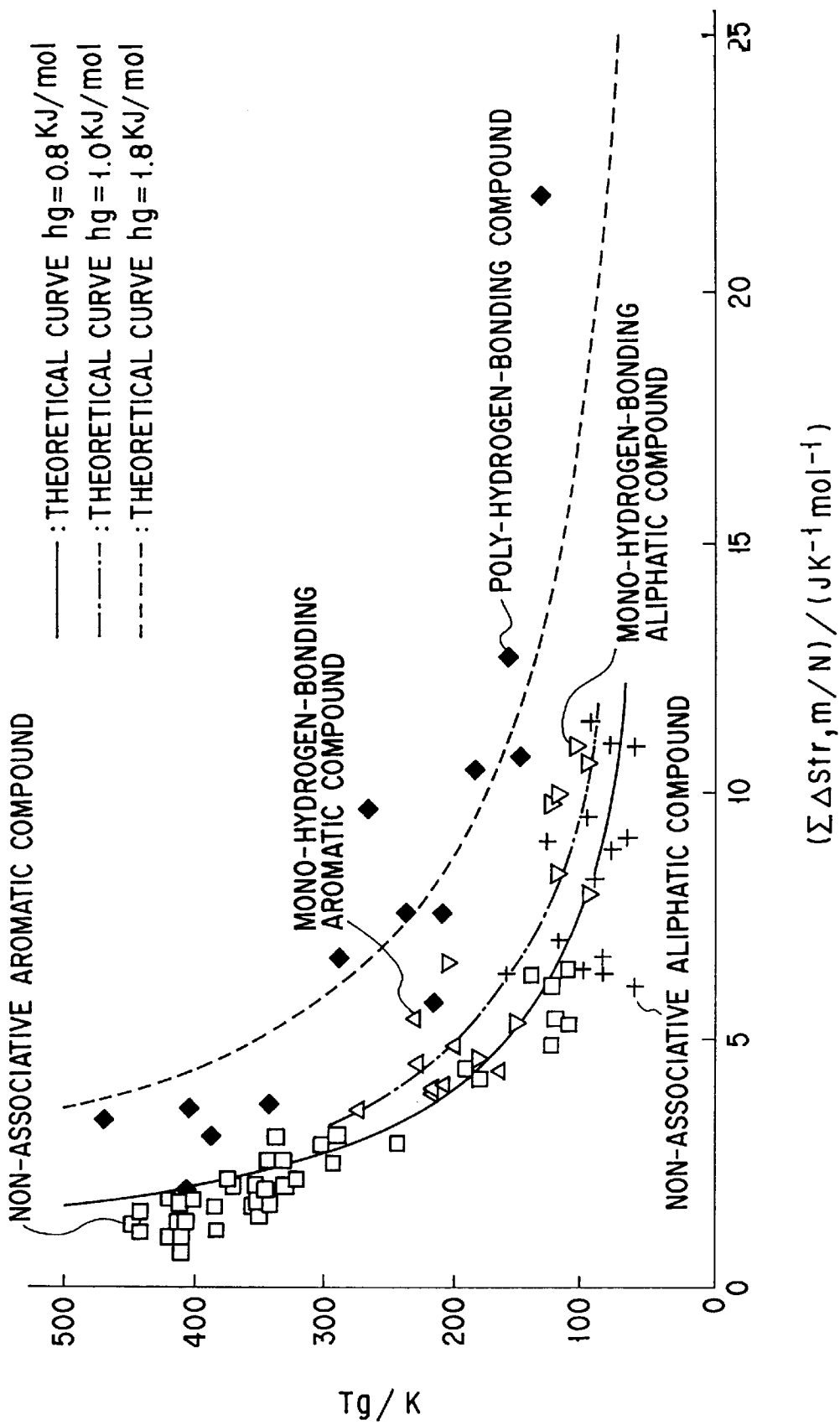
FIG. 3 is a graph showing a relationship between a glass transition temperature Tg and a transition melting entropy $\Sigma\Delta Str,m$ in various types of low-molecular weight compounds.

In the liquid crystal display element of the present invention, low-molecular weight compounds contained in the liquid crystal layer form an amorphous phase, and therefore the low-molecular weight compounds can set up a network even in a soft solid having a fluidity or a liquid state (to be called a gel state hereinafter) as in the case of polymers. For this reason, as compared to the conventional liquid crystal display element employing a compound containing a perfluoroalkyl group, which is a low-molecular weight compound which does not form an amorphous phase or does not form a network in a gel state, the present invention exhibits an excellent film-forming ability and a high long-term stability of the phase separation state.

In the present invention, it suffices if low-molecular weight compounds form a network in the present invention, and therefore the term "amorphous phase" used with regard to the present invention includes the case where the low-molecular compounds are partly crystallized. More specifically, up to about 50 weight % of the compounds may be crystallized.

FIGS. 1A and 1B are graphs showing general heat characteristics of a low-molecular weight compound of the present invention, measured by a differential scanning calorimeter (DSC). In each of these graphs, the ordinate axis indicates the temperature and the abscissa axis indicates the reaction heat.

First, as shown in FIG. 1A, the crystals of the low-molecular weight compounds melt at a melting temperature Tm, and transform into an isotropic liquid. When the isotropic liquid is cooled down quickly, a transparent amorphous phase can be obtained. When the amorphous phase low molecular weight compounds are heated, they transform into a super-cooling liquid at a glass transition temperature Tg as can be seen in FIG. 1B. When the liquid is further heated, the crystallization begins at a crystallization temperature Tc, and over this temperature, the crystals are melted. The crystallization temperature Tc depends upon the temperature raising rate. Therefore, in many cases, Tc cannot not be observed due to a high temperature-raising rate. As for the low-molecular weight compounds used in the present invention, those in which Tc cannot be observed, are preferable in consideration of the element stabilization.

With regard to the low-molecular weight compounds of the present invention, it is necessary that Tg of the amorphous state thereof should be 25° C. or higher, preferably Tg should be 50 to 100° C. When Tg is 25° C. or higher, the low-molecular weight compounds which are in an amorphous state at room temperature, exhibit a transparent glass state, and an inter-molecular network can be formed as in the case of the amorphous polymer. Consequently, a similar effect to that of the polymer dispersion liquid crystal can be obtained despite of the mixture material of low-molecular weight compounds and liquid crystal substance.

Further, Tg and Tm have substantially a proportional relationship, and therefore when Tg exceeds 100° C. Tm is extremely increased. In order to manufacture a liquid crystal display element, it is necessary to provide a step of mixing low-molecular weight compounds and liquid crystal substances while heating, so as to prepare a uniform liquid. If Tg exceeds 100° C., it is necessary to perform a very high temperature process to manufacture a liquid crystal display element, and therefore Tg of over 100° C. is not preferable.

Further, the low-molecular weight compounds of the present invention does not exhibit a distribution of molecular weights, caused in the presence of dimers and trimers, which have low polymerization degrees, unlike the case of an ordinary synthesized polymer. An ordinary synthesized polymer contains monomers which have not been polymerized, other than dimers and trimers. The reason for this is as follows. That is, with regard to the liquid crystal display element employing the polymer dispersion type liquid crystal, a mixture of monomers and liquid crystal substances is poured into a cell, and then an ultraviolet ray or the like is irradiated thereon so as to polymerize the monomers, thus hardening the mixture. In this case, as the polymerization proceeds, the viscosity of the system is increased drastically, making it difficult to diffuse the monomers. Consequently, the distribution of the molecular weights within the system occurs as shown in FIG. 2, where polymer portions of high-molecular weights and oligomer portions of low-molecular weights, containing monomers, are mixedly present. The monomer portion and the oligomer portion of low-molecular weights exhibit low glass transition temperatures even when they are in amorphous states. Therefore, the oligomer portion easily moves when the liquid crystal is driven by the application of a voltage, which causes a hysteresis in a voltage-transmittance curve. The hysteresis is not preferable since a property of the element is unstable.

In the meantime, with use of polymers such as NCAP (Nematic Curvilinear Aligned Phase) from which monomers or oligomers, which have low molecular weights, are eliminated, the hysteresis caused by the monomers, oligomers and the like, can be avoided. In the case where such polymers are used, the polymers are once dissolved into a solvent, to be poured into a cell, and then the solvent is removed. As a result, the cell gap cannot be accurately controlled.

In the liquid crystal display element of the present invention, the liquid crystal layer contains a mixture of the low-molecular weight compound which imparts a high glass transition temperature and the liquid crystal substance, and therefore it can be handled as an ordinary liquid at a high temperature, and can be easily poured into a cell. Further, at room temperature, the mixture forms a very solid matrix, and therefore the hysteresis, which should occur when a voltage is applied, does not substantially occur.

As described above, in the present invention, it is very important that the low-molecular weight compounds are not polymers of the type having a distribution of molecular weights. In the present invention, the low-molecular weight compound should preferably be a molecular weight of 1000 or less, although it is difficult to make a clear classification between a high-molecular weight compound and a low-molecular weight compound in terms of molecular weight.

The low-molecular weight compounds of the present invention are in a form of liquid having a low viscosity at the melting point or higher, and are in a super cooling liquid state when lower than the melting point. With regard to the liquid crystal display element of the present invention, it is possible to employ the ordinary method in which the low-molecular weight compounds and the liquid crystal substance are mixed together while heated, to make a uniform liquid, and the liquid crystal material is poured into a cell under a reduced pressure. It is also possible that the low-molecular weight compounds and the liquid crystal substance are dissolved into an appropriate solvent, which is applied on a cell substrate, followed by drying, so as to form a liquid crystal layer. Or it is also possible that the mixture is placed on a cell substrate without using a solvent, and an upper substrate is placed thereon such as to sandwich the mixture therebetween, and the mixture is uniformly spread while heating the entire substrates, thus forming a liquid crystal layer. It should be noted that the liquid crystal display element manufactured by any of these methods, can recover defects when it is annealed after the manufacture. Such an aspect is not entailed in the polymer dispersion liquid crystal which employs a hardening resin.

Further, in the liquid crystal display element of the present invention, the size or shape of a liquid crystal droplet can be controlled by annealing, and the operating voltages and the contrasts of manufactured liquid crystal display elements can be uniformed.

In the present invention, the shape of the mixture of the low-molecular weight compound and the liquid crystal substance, changes along with the mixture ratio of these materials. More specifically, when the ratio of the low-molecular weight compound is high, a glass-state solid which has no fluidity is obtained at room temperature, causing a great amount of scattering of light. In contrast, when the ratio of the low-molecular weight compound is low, a gel state is obtained. Such a fact coincides with the transition of the polymer dispersion liquid crystal along with the ratio of the polymer. The critical ratio which sets the mixture in a glass state or a gel state cannot be determined one dimensionally since such a critical ratio varies along with the types of the low-molecular weight compound and the liquid crystal substance. However, roughly saying, when the weight % of the low-molecular weight compound exceeds 30 to 50%, a glass state is obtained in most cases.

With regard to the liquid crystal display element of the present invention, when the low-molecular weight compounds in the liquid crystal layer are in a glass state, the liquid crystal layer is of a solid body, and has an extremely small hysteresis. Further, since the liquid crystal layer is a solid, the area of the layer can be increased by laminating an ITO film on the liquid crystal layer.

In contrast, when the low-molecular weight compounds within the liquid crystal layer are in a gel state, the liquid crystal layer is of a soft half-solid, and therefore it is difficult to make a laminate, but the light-scattering ability is enhanced as compared to the case of the glass state. Thus, the phase of the low-molecular weight compounds, that is, the glass state or the gel state, can be selected in accordance with the mode or usage of the desired liquid crystal display element.

In the present invention, the weight % of the low-molecular weight compound within the mixture of the low-molecular compound and the liquid crystal substance, is 0.1 to 90%, preferably, 10 to 80%. This is because the degree of white cloudiness is small if the amount of the low-molecular weight compound is excessive or too short. Further, when the amount of the compound is excessive, the scattering of light is reduced due to a decreased in the amount of the liquid crystal substance, and when the amount of the compound is too short, the low-molecular weight compounds do not form a network.

It is required that the low-molecular weight compound used in the present invention should be able to become an amorphous state, the glass transition temperature should be 25° C. or higher, and the liquid crystal substances should be able to be diffused therewithin. The present inventors conducted research regarding the correlation between the molecular structure of the low-molecular weight compound and the glass transition temperature, and obtained the following theoretical formula (1).

$$Tg = hg/(\Sigma \Delta Str, m/N) \tag{1}$$

where N represents the number of atoms other than hydrogen atoms, contained in one molecule of the low-molecular weight compound, $\Sigma \Delta Str,m$ represents a total (transition melting entropy) of a change in the melting entropy of the crystals of the low-molecular weight compound and a change in the transition entropy from the glass transition point to the melting point, and hg represents a substance group constant.

Various kinds of low-molecular weight compounds were measured in terms of Tg under the same conditions, that is, a sample amount of 10 to 20 mg, and a temperature raising rate of 0.08° C./s by use of a commercially available DSC. The results of the measurements were illustrated in FIG. 3, which is a characteristic diagram showing the above-mentioned relationship regarding each of the various types of the low-molecular weight compounds, taking $\Sigma\Delta Str,m/N$ in the ordinate axis and Tg in the abscissa axis. The types of the low-molecular weight compounds measured were a non-associative aromatic compound, a non-associative aliphatic compound, a mono-hydrogen-bonding aromatic compound, a mono-hydrogen-bonding aliphatic compound and a poly-hydrogen-bonding compound. In the figure, a solid line, a chain line and a broken line indicate theoretical curves when hg=0.8, 1.0 and 1.8 kJ/mol, respectively, and a dot point is a measured value regarding each of the low-molecular weight compounds. As can be understood from FIG. 3, the non-associative aliphatic compound and the mono-hydrogen-bonding aliphatic compound do not exhibit a very high Tg value, and therefore they are not suitable for the low-molecular weight compound used in the present invention.

Further, it can be understood from FIG. 3 and the formula (1) that, in order to increase the Tg value, $\Sigma\Delta Str,m/N$ should be reduced and the hg value should be increased. Therefore, in order to increase the Tg value of the low-molecular weight compound, it is considered that a low-molecular weight compound having a large N value should be synthesized in order to make the value of $\Sigma\Delta Str,m/N$ small. However, generally, when N is increased, $\Sigma\Delta Str,m$ is increased accordingly. In order to increase the Tg value, it is necessary that N should be increased without increasing the value of $\Sigma\Delta Str,m$.

Under these circumstances, the present inventors further proceeded the researches on the relationship between $\Sigma\Delta Str,m$ and N regarding each of the various types of the low-molecular weight compound, and discovered the fact that N can be increased without very much increasing $\Sigma\Delta Str,m$ if the low-molecular weight compound is made very symmetrical, spherical and dense (to have a small rotational moment). The researches further revealed that it is effective to introduce a plurality of hydrogen-bonding substituents to the low-molecular weight compound, in order to have an increase in the hg value, which results in rising of the Tg value. In this case, the entropy is apt to increase as the shape of the compound becomes asymmetrical, and therefore it is necessary to introduce hydrogen-bonding substituents at symmetrical positions so as not to increase the value of $\Sigma\Delta Str,m$.

In the meantime, in order to create an amorphous state by cooling a high-temperature liquid, it is necessary that the maximum crystal growth speed MCV should be small. Further, the MCV value should be small so as to avoid the occurrence of crystallization from the amorphous state created. The present inventors conducted researches regarding the correlation between the molecular structure of the low-molecular weight compound and the MCV, and obtained the following theoretical formula (2).

$$\ln(MCV)=\ln(k_o)-(hcN)/(Tm\Sigma\Delta Htr,m) \qquad (2)$$

where N represents the number of atoms other than hydrogen atoms, contained in one molecule of the low-molecular weight compound, $\Sigma\Delta Htr,m$ represents a total (transition melting enthalpy) of a change in the melting enthalpy of the crystals of the low-molecular weight compound and a change in the transition enthalpy from the maximum crystal growth temperature to the melting point, hg represents a substance group constant, and $k_o$ is a constant.

Figure 4:
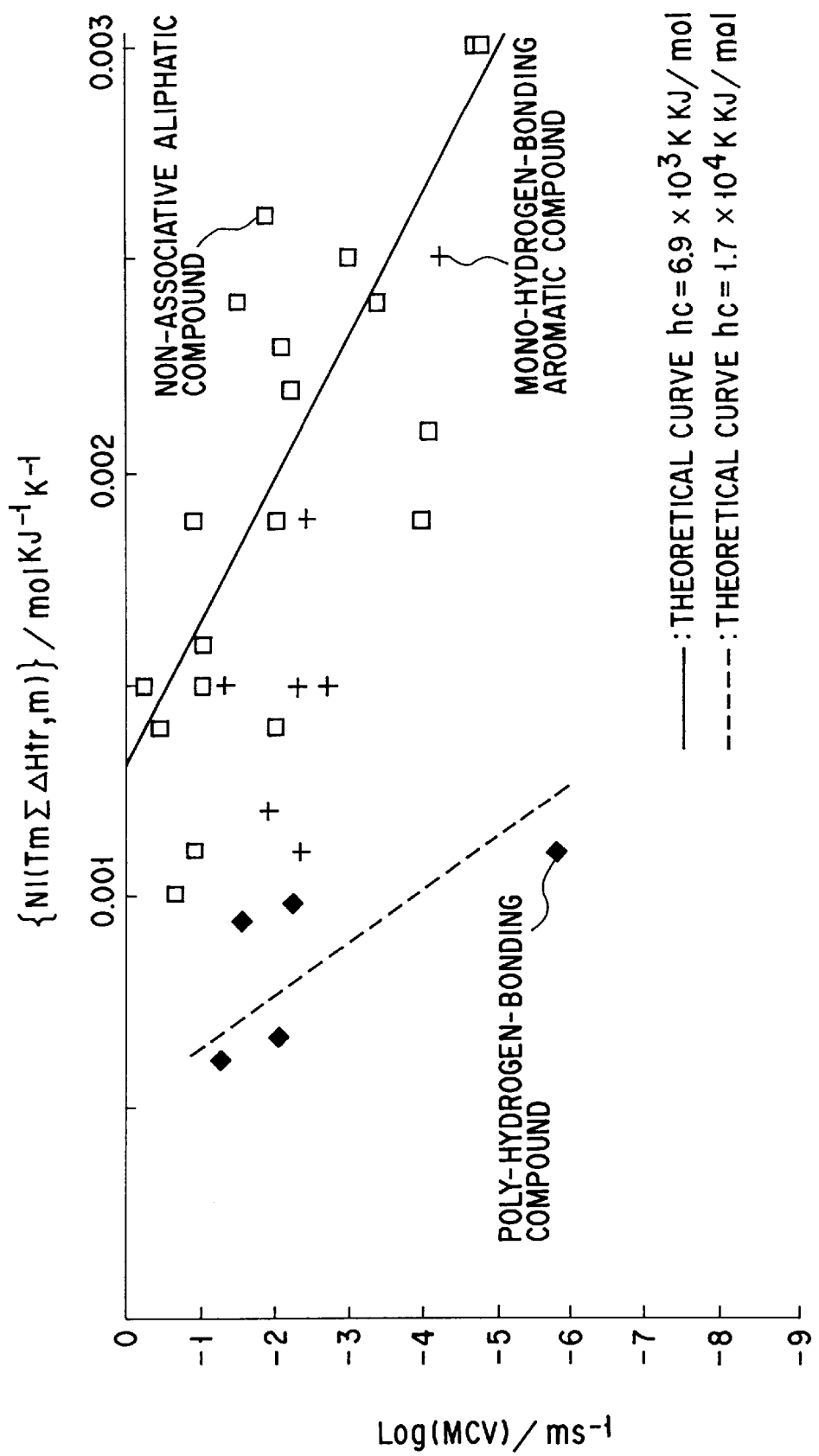
FIG. 4 is a graph showing a relationship between a maximum crystal growth velocity MCV and a transition melting enthalpy $\Sigma\Delta Str,m$ in various types of low-molecular weight compounds.

FIG. 4 is a characteristic diagram showing the above-mentioned relationship between $(\Sigma\Delta Htr,m)/N$ and MCV regarding each of the various types of the low-molecular weight compounds. The types of the low-molecular weight compounds used were a non-associative aromatic compound, a mono-hydrogen-bonding aromatic compound and a poly-hydrogen-bonding compound. In this figure, the ordinate axis indicates $N/(\Sigma\Delta Str,m)$ and the abscissa axis indicates the value of log (MCV). Further, a solid line and a broken line indicate theoretical curves when hc=6.9×10³ and 1.7×10⁴ kJ/mol, respectively, and a dot point is a measured value regarding each of the low-molecular weight compounds.

It can be understood from FIG. 4 and the formula (2) that, in order to decrease the MCV value, $\Sigma\Delta Htr,m/N$ should be reduced, Tm should be raised and the hc value should be increased. Therefore, in order to decrease the MCV value, it is considered that a low-molecular weight compound having a large N value should be synthesized in order to make the value of $\Sigma\Delta Htr,m/N$ small. However, generally, when N is increased, $\Sigma\Delta Htr,m$ is increased accordingly. In order to decrease the MCV value, it is necessary that N should be increased without increasing the value of $\Sigma\Delta Htr,m$.

Thus, it is necessary that the molecule should be made in a symmetrically spherical shape so as to cancel the dipoles within a molecule, and stereochemically weaken the interaction between molecules. It is known that a rough proportional relationship can be established between Tm and Tg, and the reduction of $\Sigma\Delta Htr,m/N$ is effective for increasing Tm. Meanwhile, as in the case of the hg value, it is effective to introduce a plurality of hydrogen-bonding substituents to the low-molecular weight compound, in order to have an increase in the substance group constant hc.

As described above, it was found that, in order to have a high Tg value and a small MCV value, the conditions such as a large molecule, a symmetrical and spherical molecular structure and the introduction of a plurality of hydrogen-bonding substituents, are effective. It should be noted that specific examples of the hydrogen-bonding substituent are hydroxide group, primary and secondary amino groups, primary and secondary amido bonding groups, urethane-bonding group, urea bonding group, hydrazone bonding group, hydrazine group, carboxyl group.

Further, since the low-molecular weight compound used in the present invention is used in the liquid crystal display device, it is necessary that an amorphous state, which has a good light transmittance, should be easily obtained.

Accordingly, the low-molecular weight compound of the present invention should preferably be a compound which does not carry out an absorption in a visible radiation band, and has a bulky molecular structure close to a spherical shape. Examples of such a steroid compound are those represented by formulas (A-1) to (A-16) as below.

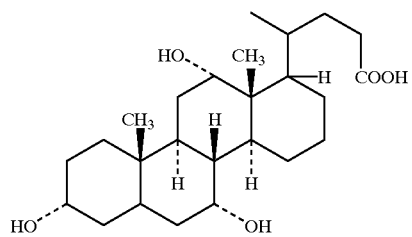

(A-1)

-continued
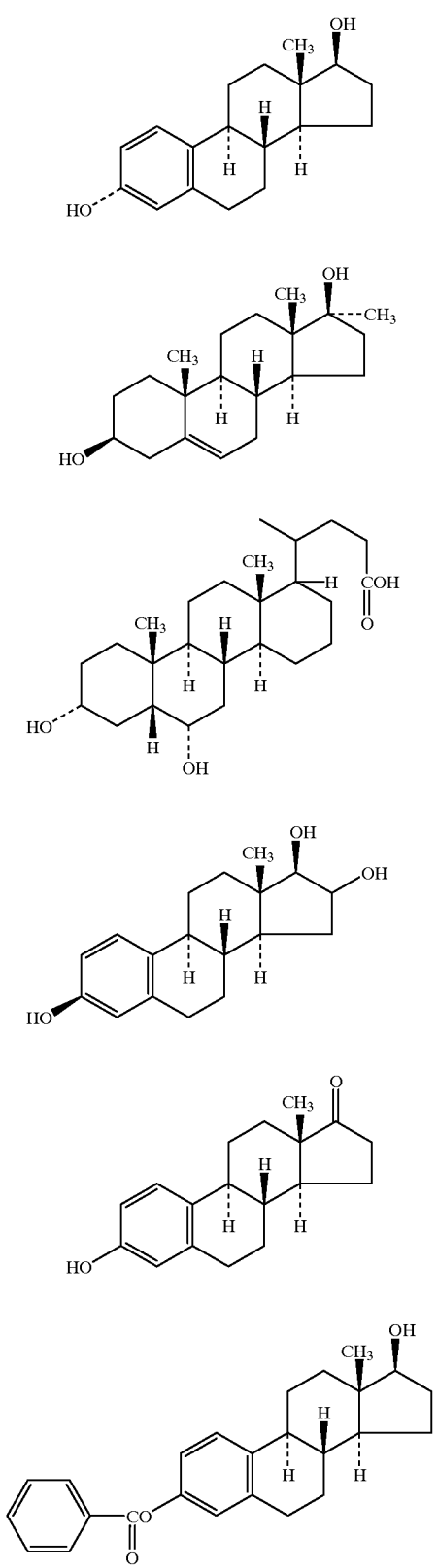
(A-2)
(A-3)
(A-4)
(A-5)
(A-6)
(A-7)
-continued
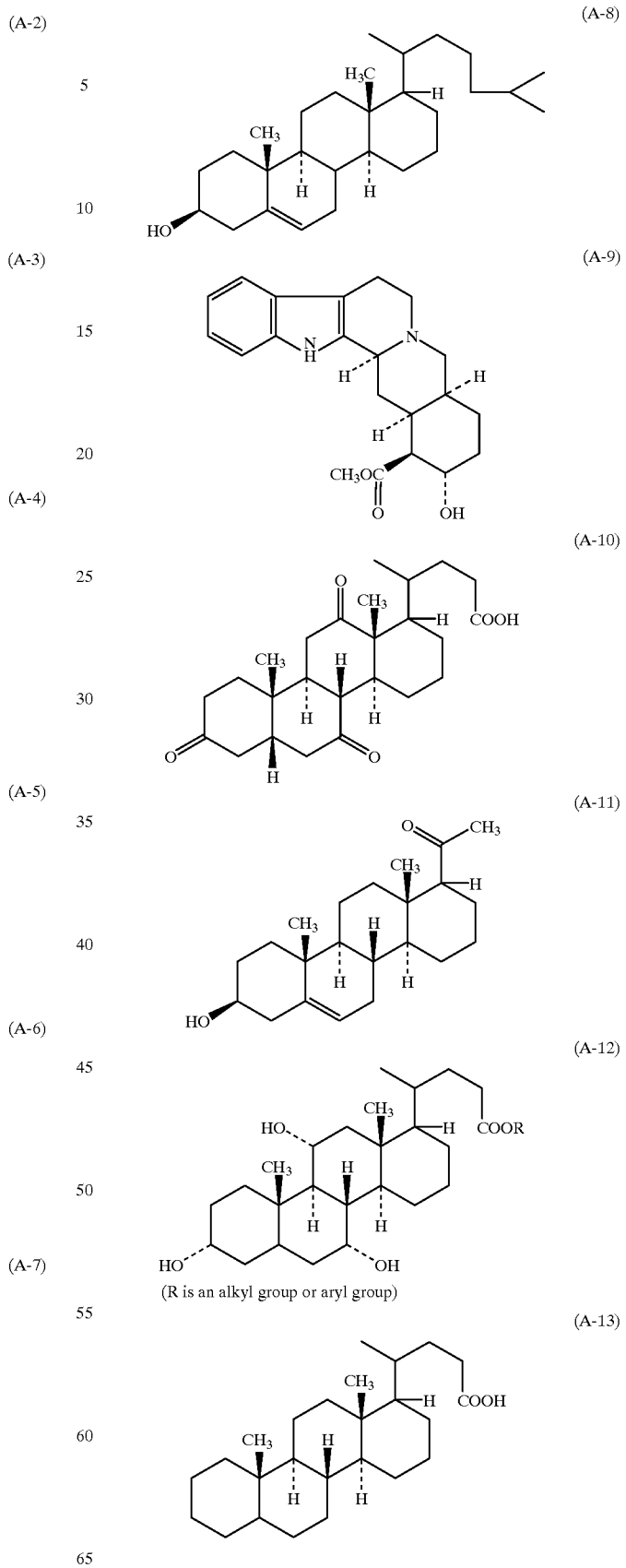
(A-8)
(A-9)
(A-10)
(A-11)
(A-12)
(R is an alkyl group or aryl group)
(A-13)

(A-14)

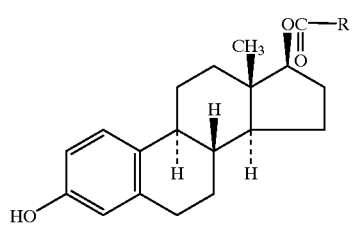

(R is an alkyl group or aryl group)

(A-15)

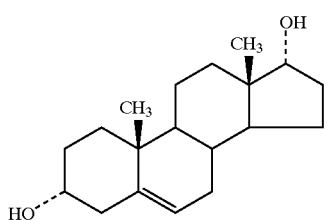

(A-16)

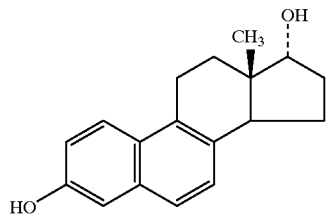

The low-molecular weight compound of the present invention may be of an aromatic type. Examples of such an aromatic compound are those represented by formulas (B-1) to (B-12) as below. With regard to the aromatic compound, a high Tg value can be obtained even in the absence of a hydrogen-bonding substituent, due to a strong interaction between aromatic rings; however generally, the Tg/Tm value is larger when the compound contains a plurality of hydrogen-bonding substituents. Since a low Tm value is advantageous in manufacturing a liquid crystal display element, it is preferable that even the aromatic compound should contain a hydrogen-bonding substituent. In the case where an aromatic compound is used, the transparency of the product element is lower than that of a steroid compound due to the presence of aromatic rings; however the synthesis of the compound is easier than the case of the steroid compound.

(B-1)

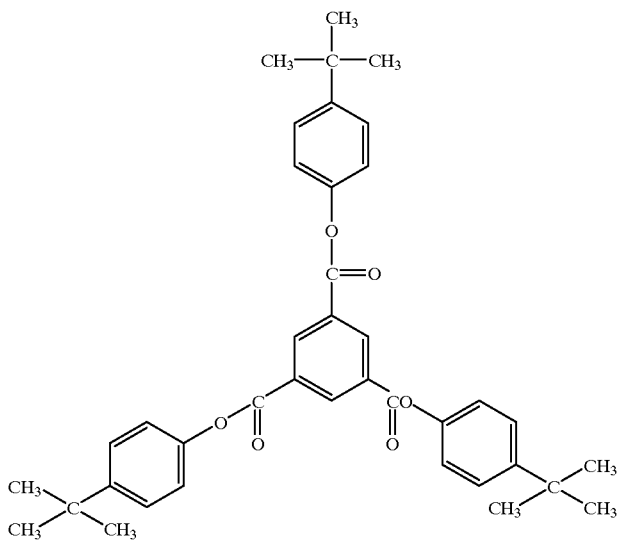

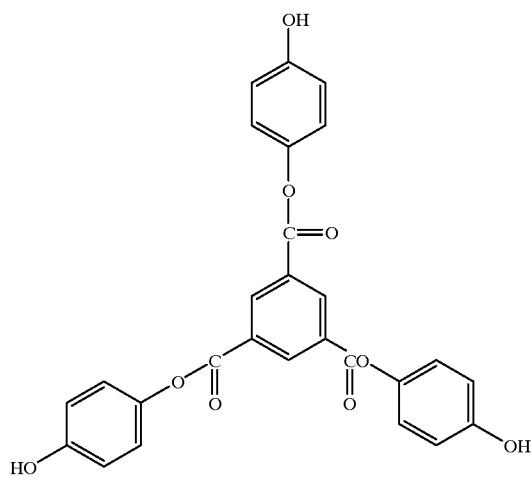
(B-2)
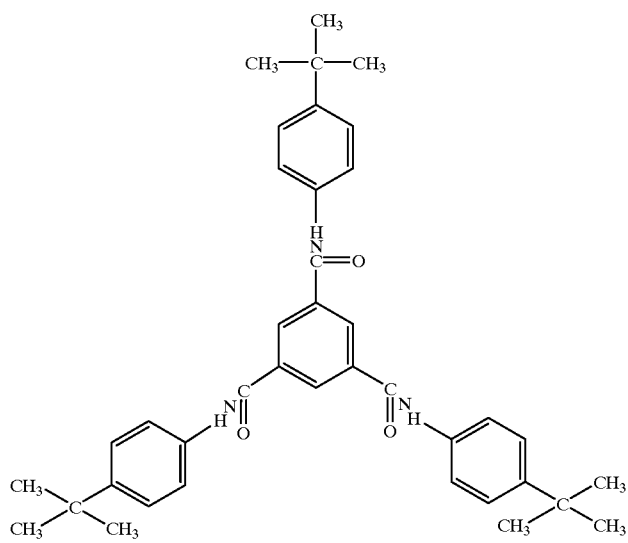
(B-3)
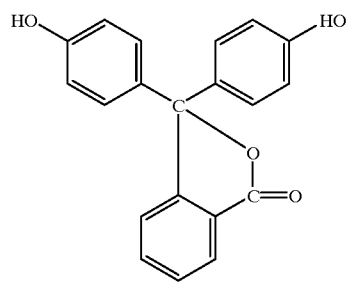
(B-4)

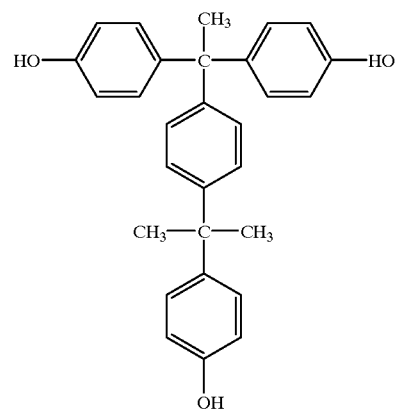
(B-5)
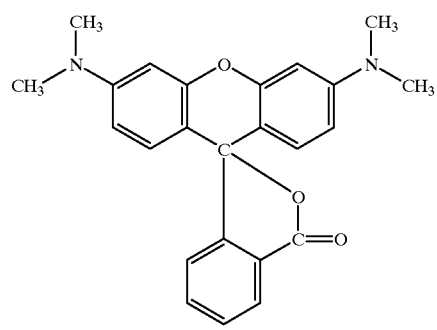
(B-6)
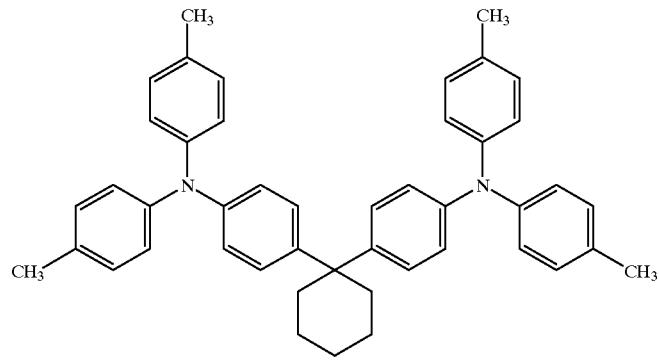
(B-7)

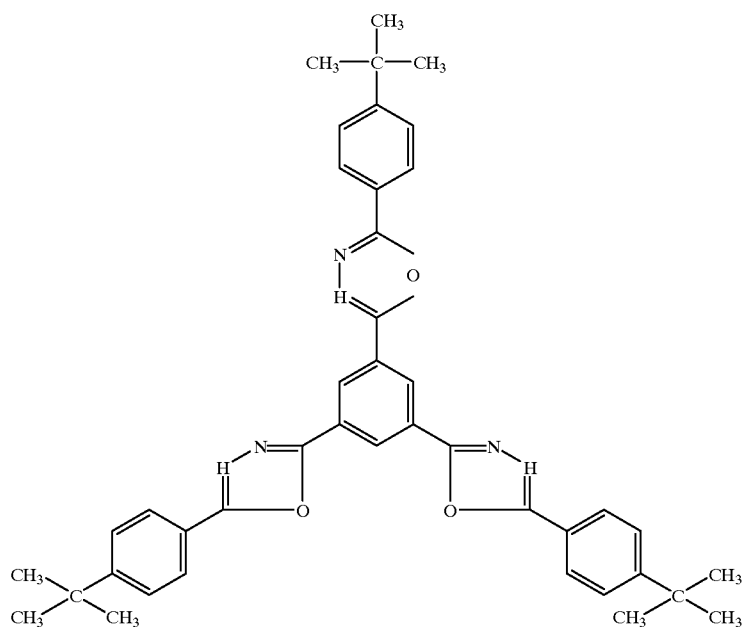
(B-8)
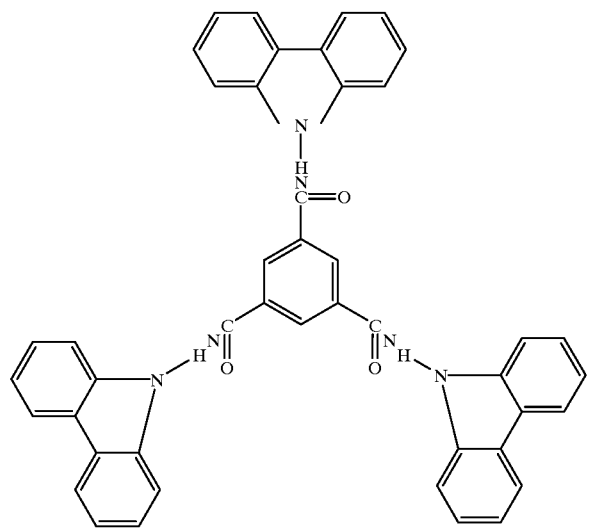
(B-9)
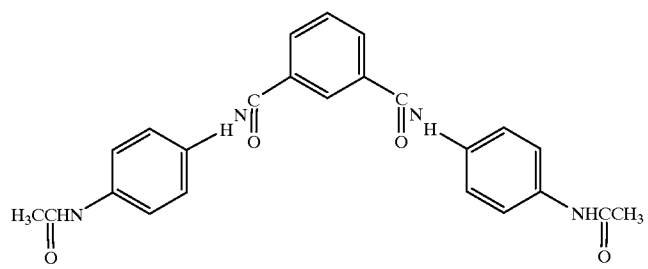
(B-10)

-continued (B-11)

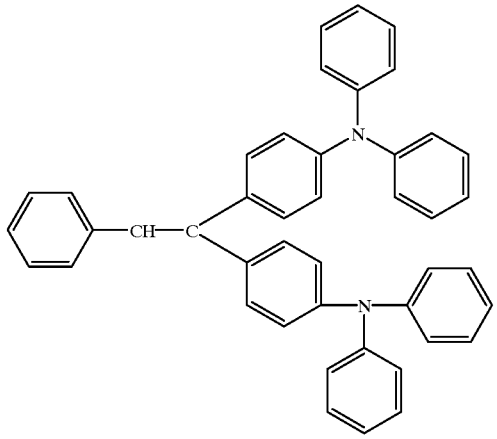

(B-12)

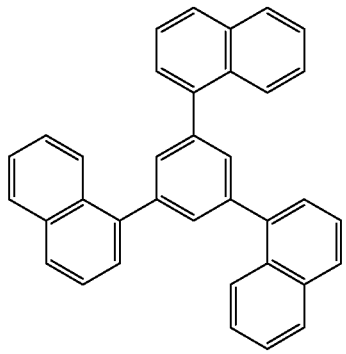

The state of the low-molecular weight compound, that is, whether crystalline or amorphous, can be easily analyzed by a general method such as an X-ray diffraction, an electron beam diffraction or a light transmittance measurement. When in a crystalline state, an X-ray diffraction or electron beam diffraction occurs, and a sharp peak, spot or the like is observed, whereas when in an amorphous state, no sharp peak or spot is obtained.

In the light transmittance measurement, the scattering of light can be evaluated. In the case of a polycrystal state, as the wavelength of light becomes shorter, the scattering of light becomes stronger. Therefore, the shorter the wavelength, the lower the light transmittance. Consequently, with confirmation of the wavelength dependency as described above, the reduction of the light transmittance due to absorption can be distinguished from that caused by scattering of light, and the grain diameter of the crystals can be estimated. In the case where the scattering of light is turned on/off by a voltage so as to cause a shift between a transparent state and a white-cloudy state, the refractive index of the low-molecular weight compound need to be adjusted to the refractive index at the time of turning on the liquid crystal substance.

In the present invention, it is important that the low-molecular weight compound forms a network in an amorphous state. In this case, even if the low-molecular weight compound is partially crystallized, the operation of the liquid crystal display element is not disturbed. However, with the partial crystallization, the contrast and the like are lowered in some cases, and therefore the crystallization of the low-molecular weight compound should preferably be less as possible.

The liquid crystal substance of the present invention is of an arbitrary type as long as it has a refractive index anisotropy and changes its alignment along with voltage; however preferable examples thereof are nematic liquid crystal and cholesteric liquid crystal.

In the liquid crystal element of the present invention, a dichoic pigment may be used as one of the structural elements of the liquid crystal layer for the purpose of improving the contrast, and achieving a color display. In this case, as the dichoic pigment, a type which can be dissolved into the liquid crystal substance but is not easily dissolved into the low-molecular weight compound, should be used. Further, when the dichoic pigment is used, the weight ratio thereof with respect to that of the liquid crystal substance should be 0.01 to 10%, preferably, 0.1 to 5%. If the weight ratio of the pigment is too low, the contrast is not sufficiently improved. In contrast, if the weight ratio is too high, the coloring remains even when a voltage is applied, thereby deteriorating the contrast.

In the case where the dichoic pigment is contained in the liquid crystal layer, an appropriate refractive index should be selected for each of the low-molecular weight compound and the liquid crystal substance in accordance with object. More specifically, in order to improve the contrast is raised by utilizing the scattering of light, it is preferable that a liquid crystal substance having a high refractive index anisotropy should be used. However, the use of such a liquid crystal substance may cause whitening of the color of the reflection light. In contrast, in the case where the refractive index anisotropy is low, and the refractive index thereof is close to that of the low-molecular weight compound, the original colors of the dichoric pigment can be obtained.

Further, in the liquid crystal display element of the present invention, a fluorescent pigment may be used as one of the structural element of the liquid crystal layer for the purpose of increase white in the reflection light and absorbing the ultraviolet rays. In this case, the fluorescent pigment should preferably be of a type which is dissolved into the low-molecular weight compound, but is not easily dissolved into the liquid crystal substance.

The liquid crystal display element of the present invention may contain a polymer having a molecular weight of 1000 or more. For example, the element may contain a thermoplastic resin. Further, the element may contain a combination of a thermosetting resin, a hardener and a hardening promoter, or a combination of a photohardening resin, a photohardener and a hardening promoter. In the case where the thermosetting resin or the photosetting resin is present, the resin is hardened by heating or irradiating light after pouring the mixture into a cell. In the case where any of these resins are present in the liquid crystal layer, a network in which a resin and an amorphous low-molecular weight compound are combined, is formed, and therefore the hysteresis, which is observed in the case of the polymer dispersion liquid crystal, is improved. Further, in some cases, the long-term stability of the liquid crystal layer is further improved. In this case, it suffices only if the ratio of the polymer with respect to that of the liquid crystal substance is 0.1 to 80%.

With regard to the liquid crystal display element of the present invention, examples of the substrate are a glass substrate or plastic substrate in which an electrode pattern made of ITO is formed, a substrate on which a TFT element is formed, and a color filter on the surface of which an electrode made of ITO is formed. The distance between the two substrates, that is, the thickness of the cell, is 1 to 100 $\mu$m, preferably, 5 to 50 $\mu$m. In the case where the cell is made too thin, a sufficient contrast cannot be obtained. On the other hand, when the cell is made too thick, a high driving voltage is required.

The mixture of the amorphous low-molecular weight compound and the liquid crystal substance, which is supplied in the liquid crystal layer of the display element of the present invention, may be prepared just before it should be poured into a cell, or in advance. In consideration of the efficiency of the manufacturing step, the mixture should be prepared in advance. In the case where the mixture is preserved for a long time after the preparation thereof, the mixture is, before it is used, heated to be a uniform isotropic liquid, and stirred. It is preferable that the mixture should be heated to be an isotropic liquid and then poured into a cell.

After the pour of the mixture into the cell, the pour opening is sealed with a thermosetting or photo-setting resin. Instead of pouring the mixture into a cell, it is also possible that the low-molecular weight compound and the liquid crystal substance is dissolved into a proper solvent, the solution is applied on a cell substrate, and the solution is dried. Alternatively, it is also possible that the low-molecular weight compound and the liquid crystal substance is mixed while heating without using a solvent, a cooled mixture is placed on a cell substrate, an upper substrate is placed thereon, sandwiching the mixture, and the mixture is uniformly spread while heating these members.

In the display element of the present invention, there is no need to provide a polarizing plate, as in the case of the conventional polymer dispersion liquid crystal display element. Further, the alignment process by rubbing is not necessary, which is a significant merit of the invention.

As described, the liquid crystal display element of the invention entails a very facilitated manufacture method as compared to the case of the display element which employs a polymer dispersion type liquid crystal, and the dispersion of the characteristics caused by different processing conditions, can be suppressed.

Figure 5A:
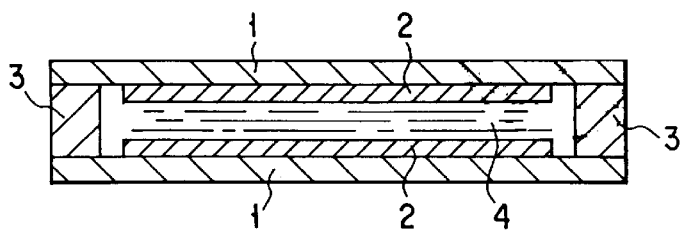
FIG. 5A is a cross sectional view of a liquid crystal element according to an embodiment of the present invention.
Figure 5B:
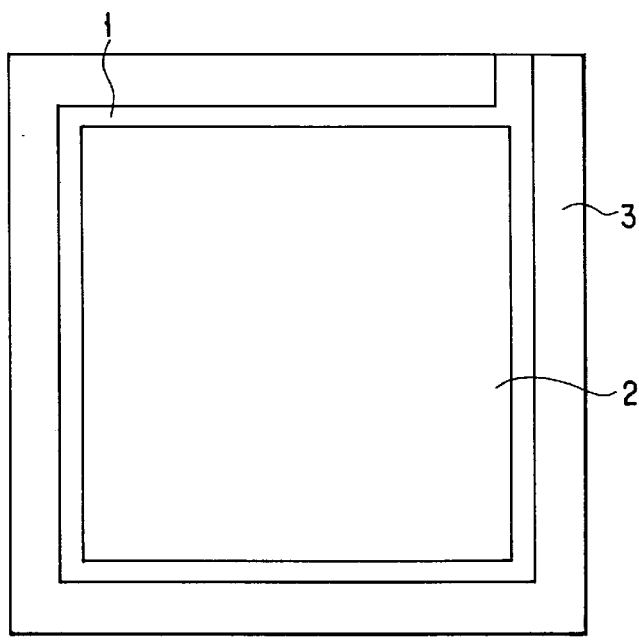
FIG. 5B is a plan view of the liquid crystal element according to the embodiment of the present invention.

Examples of the present invention will now be described with reference to accompanying drawings. In each of the below-described examples, a liquid crystal display element such as shown in FIGS. 5A and 5B was formed. More specifically, as show in FIG. 5A, on the surface of one of two glass substrates 1, a transparent electrode 2 made of ITO (indium tin oxide) was formed. These glass substrates 1 were adhered to each other via adhesive layers 3 by their edge portions. Between the glass substrates 1, a liquid crystal layer 4 was provided. The dimensions of this liquid crystal cell were 3 cm in length, 2 cm in width, and the cell gap d ($\mu$m) was appropriately set.

EXAMPLE 1

1 g of cholic acid (of TOKYO CHEMICAL SYNTHESIS CO., Chemical Formula A-1) which creates an amorphous state and has a glass transition temperature of 115° C., serving as a low-molecular weight compound, and 1 g of nematic liquid crystal (of MERK CO., E-7) serving as a liquid crystal substance, were inserted into a glass-made test tube. The mixture was heated up to 200° C. and stirred until it became uniformly transparent. When the obtained mixture was cooled down to room temperature, white-cloudy glass-like solid was obtained. Then, the mixture was heated once again to 200° C. to make an isotropic liquid.

In the meantime, a liquid crystal cell in which d=10 $\mu$m was set, was heated up to 200° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 1 was manufactured.

Thus obtained liquid crystal display element was measured in terms of threshold voltage $V_{th}$ and transmittance.

Figure 6:
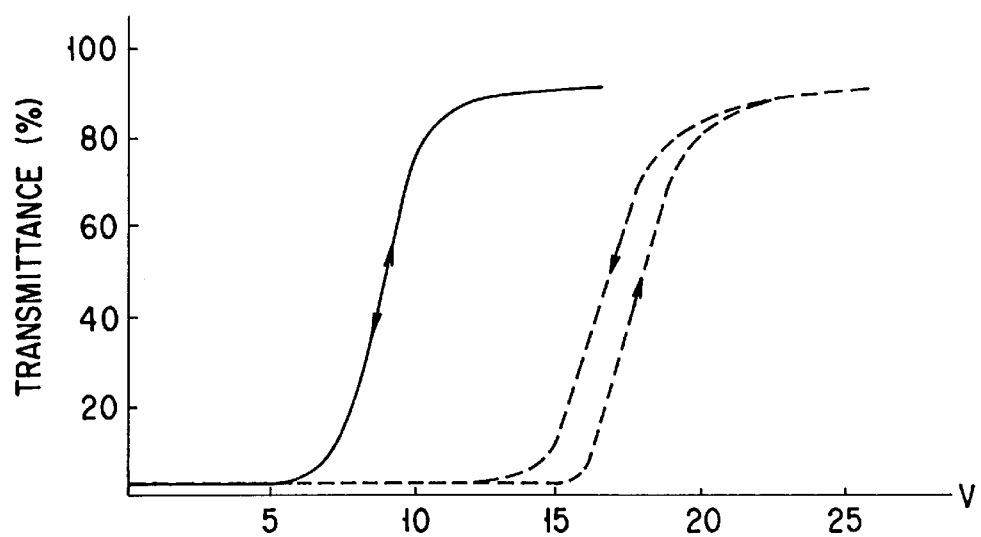
FIG. 6 is a graph showing a voltage-transmittance curve of the liquid crystal element of the embodiment of the present invention.

The contrast was represented by a ratio of the transmittance between when a voltage is applied and when a voltage is not applied. The results were as follows, that is, $V_{th}$ (90%) of 10.3 V, a contrast of 1:35, and a transmittance of 83%. The characteristics of the element were as illustrated in the graph of FIG. 6, in which the effective voltage was taken in the ordinate axis and the transmittance was taken in the abscissa axis. As shown in this figure, as indicated by the solid line, no substantial hysteresis was observed with regard to the liquid crystal display element of this example. Further, the characteristics did not substantially vary even after the display element was left alone for one month at room temperature. It is considered that this is because a liquid crystal is dispersed in cholic acid matrix having no molecular weight distribution and a high glass transition point.

Comparative Example 1

As a comparative example to Example 1, a liquid crystal display element which employs a polymer dispersion type liquid crystal, was prepared in the following manner. That is, 50 ml of nematic liquid crystal (of MERK CO., INC, E-7) was dispersed within 100 ml of a 5 weight % gelatin solution, to prepare an emulsion at a temperature of 47° C. To this emulsion, 100 ml of a 5 weight % gum arabic aqueous solution having a temperature of 47° C. was added, and then 10%-acetic acid was added drop by drop so as to adjust pH to 3.5. Then, 170 ml of warm water was added slowly in portions of 3 ml, and the temperature was gradually lowered down to 5° C. After that, diluted formaldehyde was added to this mixture until the entire concentration became 6 mM, and the pH value of the mixture was adjusted to 8.5 with a 10%-sodium hydroxide aqueous solution. The resultant mixture was applied on a substrate on which an ITO film was formed to form a polymer dispersion type liquid crystal film having a thickness of 15 μm, and then a PET film on which an ITO film was made, was laminated thereon so that the ITO film is brought into contact with the polymer dispersion type liquid crystal film. Thus, a liquid crystal display element according to Comparative Example 1 was manufactured.

Thus obtained liquid crystal display element was examined in terms of threshold voltage $V_{th}$, contrast and transmittance, as in the case of Example 1. The results were as follows, that is, $V_{th}$ (90%) of 20 V, a contrast of 1:30, and a transmittance of 84%. As indicated by the broken line, a hysteresis was observed. It is considered that this is because the polymer has a molecular weight distribution.

Comparative Example 2

As a comparative example to Example 1, a liquid crystal display element which employed a compound containing a perfluoroalkyl group, was manufactured. More specifically, 0.3 g of 1H, 1H, 1H, 1H-perfluorooctyl-4'-n-octyloxy-biphenylcarboxylate ester and 1 g of nematic liquid crystal (of MERK CO., E-7) were inserted into a glass-made test tube. The mixture was heated up to 100° C. and stirred until it became uniformly transparent. When the obtained mixture was cooled down to room temperature, white-cloudy gel-like matter was obtained. Then, the mixture was heated once again to 100° C. to make an isotropic liquid.

In the meantime, a liquid crystal cell in which d=10 μm was set, was heated up to 100° C. on a hot plate within a vacuum atmosphere, and the heated isotropic liquid was poured into the liquid crystal cell. After that, the liquid crystal cell was cooled down to room temperature. In the above-described manner, a liquid crystal display element according to Comparative Example 2 was manufactured.

Thus obtained liquid crystal display element was examined in terms of threshold voltage $V_{th}$, contrast and transmittance, as in Example 1. The results were as follows, that is, $V_{th}$ (90%) of 8.2 V, a contrast of 1:33, and a transmittance of 80%. No substantial hysteresis was observed with regard to the liquid crystal display element of this example. However, after the element was left alone for one month at room temperature, it was once again measured in terms of these characteristics. The results were as follows, that is, $V_{th}$ (90%) of 6.2 V, a contrast of 1:10, and a transmittance of 90%. As the results indicates, the contrast was deteriorated, and it was found that this example has a low long-term stability.

EXAMPLE 2

A liquid crystal display element according to Example 2 was manufactured in the same manner as that of Example 1 except that a liquid crystal cell in which d=25 μm was set, was used. The characteristics of the liquid crystal display element was examined in the same manner as that of Example 1. The results were as follows, that is, $V_{th}$ (90%) of 25 V, a contrast of 1:70, and a transmittance of 65%. As in the case of Example 1, no substantial hysteresis was observed, or the characteristics did not substantially vary after being left alone.

EXAMPLE 3

1 g of β-estoradiol (of TOKYO CHEMICAL SYNTHESIS CO., Chemical Formula A-2) which creates an amorphous state and has a glass transition temperature of 76° C., serving as a low-molecular weight compound, and 1 g of nematic liquid crystal (of MERK CO., E-7) serving as a liquid crystal substance, were inserted into a glass-made test tube. The mixture was heated up to 180° C. and stirred until it became uniformly transparent. When the obtained mixture was cooled down to room temperature, white-cloudy glass-like solid was obtained. Then, the mixture was heated once again to 180° C. to make an isotropic liquid.

In the meantime, a liquid crystal cell in which d=10 μm was set, was heated up to 180° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 3 was manufactured.

Thus obtained liquid crystal display element was examined in terms of the characteristics as in the case of Example 1. The results were as follows, that is, $V_{th}$ (90%) of 12.5 V, a contrast of 1:30, and a transmittance of 80%. As in the case of Example 1, no substantial hysteresis was observed, or the characteristics did not substantially vary even after being left alone.

EXAMPLE 4

A liquid crystal display element according to Example 4 was manufactured in the same manner as that of Example 1 except that methylandrostendiol (of TOKYO CHEMICAL SYNTHESIS CO., Chemical Formula A-3) which creates an phosphorescent state and has a glass transition temperature of 71° C. was used in place of cholic acid as the low-molecular compound. The characteristics of this liquid crystal display element was examined in the same manner as that of Example 1. The results were as follows, that is, $V_{th}$ (90%) of 11.5 V, a contrast of 1:32, and a transmittance of 84%. As in the case of Example 1, no substantial hysteresis was observed, or the characteristics did not substantially vary after being left alone.

EXAMPLE 5

0.5 g of cholic acid and 0.5 g of β-estoradiol, serving as low-molecular weight compounds, and 1 g of nematic liquid crystal (of MERK CO., E-7) serving as a liquid crystal substance, were inserted into a glass-made test tube. The mixture was heated up to 200° C. and stirred until it became uniformly transparent. When the obtained mixture was cooled down to room temperature, white-cloudy glass-like solid was obtained. Then, the mixture was heated once again to 170° C. to make an isotropic liquid.

In the meantime, a liquid crystal cell in which d=10 μm was set, was heated up to 170° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 5 was manufactured.

Thus obtained liquid crystal display element was examined in terms of the characteristics as in the case of Example 1. The results were as follows, that is, $V_{th}$ (90%) of 10.5 V, a contrast of 1:32, and a transmittance of 84%. As in the case of Example 1, no substantial hysteresis was observed, or the characteristics did not substantially vary even after being left alone.

EXAMPLE 6

A liquid crystal display element according to Example 6 was manufactured in the same manner as that of Example 1 except that 0.25 g of cholic acid was used in place of 1 g thereof. In the case, not a white-cloudy glass-like solid, but a white-cloudy gel state was obtained. The characteristics of this liquid crystal display element was examined in the same manner as that of Example 1. The results were as follows, that is, $V_{th}$ (90%) of 10.5 V, a contrast of 1:40, and a transmittance of 87%. As in the case of Example 1, no substantial hysteresis was observed, or the characteristics did not substantially vary after being left alone.

EXAMPLE 7

1 g of cholic acid serving as a low-molecular weight compound, 1 g of nematic liquid crystal (of MERK CO., ZLI-1840) serving as a liquid crystal substance, and 0.03 g of dichroic pigment for black (MITSUI TOHATSU CO, S-344) were inserted into a glass-made test tube. The mixture was heated up to 200° C. and stirred until it became uniformly transparent. When the obtained mixture was cooled down to room temperature, a black glass-like solid was obtained. Then, the mixture was heated once again to 200° C. to make an isotropic liquid.

In the meantime, a liquid crystal cell in which d=10 μm was set, was heated up to 200° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 7 was manufactured.

Thus obtained liquid crystal display element was examined in terms of the characteristics as in the case of Example 1. The results were as follows, that is, $V_{th}$ (90%) of 14.8 V, a contrast of 1:45, and a transmittance of 75%. As in the case of Example 1, no substantial hysteresis was observed, or the characteristics did not substantially vary even after being left alone.

EXAMPLE 8

1 g of cholic acid serving as a low-molecular weight compound and 1 g of nematic liquid crystal (of MERK CO., ZLI-1840) serving as a liquid crystal substance were added into ethanol, and dissolved therein while heating. Thus obtained solution was applied on a polycarbonate substrate on which an ITO film is formed, so as to form a white-cloudy film having a thickness of 10 μm. Then, aluminum was deposited on this film by evaporation, thus forming an aluminum electrode having a dimension of 1 cm². In the above-described manner, a liquid crystal display element according to Example 8 was manufactured.

Thus obtained liquid crystal display element was examined in terms of the characteristics as in the case of Example 1. The results were as follows, that is, $V_{th}$ (90%) of 10.2 V, a contrast of 1:33, and a transmittance of 83%. As in the case of Example 1, no substantial hysteresis was observed, or the characteristics did not substantially vary even after being left alone.

EXAMPLE 9

1 g of hyodeoxycholic acid (of TOKYO CHEMICAL SYNTHESIS CO., Chemical Formula A-4) which creates an amorphous state and has a glass transition temperature of 54° C., serving as a low-molecular weight compound, and 1 g of nematic liquid crystal (of MERK CO., E-7) serving as a liquid crystal substance, were inserted into a glass-made test tube. The mixture was heated up to 120° C. and stirred until it became uniformly transparent. When the obtained mixture was cooled down to room temperature, white-cloudy glass-like solid was obtained. Then, the mixture was heated once again to 110° C. to make an isotropic liquid.

In the meantime, a liquid crystal cell in which d=10 μm was set, was heated up to 110° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 9 was manufactured.

Thus obtained liquid crystal display element was examined in terms of the characteristics as in the case of Example 1. The results were as follows, that is, $V_{th}$ (90%) of 11.5 V, a contrast of 1:32, and a transmittance of 81%. As in the case of Example 1, no substantial hysteresis was observed, or the characteristics did not substantially vary even after being left alone.

EXAMPLE 10

0.2 g of hyodeoxycholic acid serving as a low-molecular compound, 1 g of nematic liquid crystal (of MERK CO., E-7) serving as a liquid crystal substance, 0.1 g of epoxy resin (YUKA SHELL CO., Epicoat 828) serving as a thermosetting resin, and 3 mg of triethyl-tertramine were inserted into a glass-made test tube. The mixture was heated up to 120° C. and stirred until it became uniformly transparent. When the obtained mixture was cooled down to room temperature, a white-cloudy gel-like was obtained.

In this example, a liquid crystal display element was manufactured by use of two substrates as shown in FIG. 5A, in the following manner. That is, a small amount of the gel was dropped on the lower substrate, and then the upper substrate was pressed thereon via spherical spacers each having a diameter of 10 μm. Thus, a liquid crystal display element according to Example 10 was prepared. Thus obtained element was heated once again to 170° C. for one hour to harden the epoxy component.

Thus obtained liquid crystal display element was examined in terms of the characteristics as in the case of Example 1. The results were as follows, that is, $V_{th}$ (90%) of 10.5 V, a contrast of 1:40, and a transmittance of 83%. As in the case of Example 1, no substantial hysteresis was observed, or the characteristics did not substantially vary even after being left alone. Further, the change in characteristics after being left alone, was less than that of the case of the liquid crystal display element which did not use a thermosetting resin.

EXAMPLE 11

0.2 g of hydrocleoxycholic acid serving as a low-molecular compound, 1 g of nematic liquid crystal (of MERK CO., E-7) serving as a liquid crystal substance, 0.1 g of butylacrylate serving as a photosensitive monomer, which is the material of a photosetting resin, and Irgacure 651 (CHIBA GAIGIE CO.) were inserted into a glass-made test tube. The mixture was heated up to 120° C. and stirred until it became uniformly transparent. When the obtained mixture was cooled down to room temperature, a white-cloudy gel-like was obtained.

In this example, a liquid crystal display element was manufactured by use of two substrates as shown in FIG. 5A, in the following manner. That is, a small amount of the gel was dropped on the lower substrate, and then the upper substrate was pressed thereon via spherical spacers each having a diameter of 10 μm. Thus, a liquid crystal display element according to Example 11 was manufactured. Thus obtained element was irradiated with light of a mercury lamp of 80 W/cm², so as to polymerize butylacrylate.

Thus obtained liquid crystal display element was examined in terms of the characteristics as in the case of Example 1. The results were as follows, that is, $V_{th}$ (90%) of 10.2 V, a contrast of 1:42, and a transmittance of 83%. As in the case of Example 1, no substantial hysteresis was observed, or the characteristics did not substantially vary even after being left alone. Further, the change in characteristics after being left alone, was less than that of the case of the liquid crystal display element which did not use a photosetting resin.

EXAMPLE 12

1 g of triphenylamine derivative (Chemical Formula B-7) which creates an amorphous state and has a glass transition temperature of 78° C., serving as a low-molecular weight compound, and 1 g of nematic liquid crystal (of MERK CO., E-7) serving as a liquid crystal substance, were inserted into a glass-made test tube. The mixture was heated up to 185° C. and stirred until it became uniformly transparent. When the obtained mixture was cooled down to room temperature, white-cloudy glass-like solid was obtained. Then, the mixture was heated once again to 185° C. to make an isotropic liquid.

In the meantime, a liquid crystal cell in which d=10 μm was set, was heated up to 185° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 12 was manufactured.

Thus obtained liquid crystal display element was examined in terms of the characteristics as in the case of Example 1. The results were as follows, that is, $V_{th}$ (90%) of 10.6 V, a contrast of 1:33, and a transmittance of 80%. As in the case of Example 1, no substantial hysteresis was observed, or the characteristics did not substantially vary even after being left alone.

EXAMPLE 13

1 g of oxadiazol derivative (Chemical Formula B-8) which creates an amorphous state and has a glass transition temperature of 139° C., serving as a low-molecular weight compound, and 1 g of nematic liquid crystal (of MERK CO., E-7) serving as a liquid crystal substance, were inserted into a glass-made test tube. The mixture was heated up to 185° C. and stirred until it became uniformly transparent. When the obtained mixture was cooled down to room temperature, white-cloudy glass-like solid was obtained. Then, the mixture was heated once again to 185° C. to make an isotropic liquid.

In the meantime, a liquid crystal cell in which d=10 μm was set, was heated up to 185° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 13 was manufactured.

Thus obtained liquid crystal display element was examined in terms of the characteristics as in the case of Example 1. The results were as follows, that is, $V_{th}$ (90%) of 10.8 V, a contrast of 1:31, and a transmittance of 81%. As in the case of Example 1, no substantial hysteresis was observed, or the characteristics did not substantially vary even after being left alone.

EXAMPLE 14

0.1 g of carbazol derivative (Chemical Formula B-9) which creates an amorphous state and has a glass transition temperature of 230° C., serving as a low-molecular compound, and 1 g of nematic liquid crystal (of MERK CO., E-7) serving as a liquid crystal substance, were inserted into a glass-made test tube. The mixture was heated up to 180° C. and stirred until it became uniformly transparent. When the obtained mixture was cooled down to room temperature, white-cloudy gel-like solid was obtained. Then, the mixture was heated once again to 180° C. to make an isotropic liquid.

In the meantime, a liquid crystal cell in which d=10 μm was set, was heated up to 180° C. on a hot plate within a vacuum atmosphere, and the heated isotropic liquid was poured into the liquid crystal cell. After that, the liquid crystal cell was gradually cooled down to room temperature. In the above-described manner, a liquid crystal display element according to Example 14 was manufactured.

Thus obtained liquid crystal display element was examined in terms of the characteristics as in the case of Example 1. The results were as follows, that is, $V_{th}$ (90%) of 11.3 V, a contrast of 1:39, and a transmittance of 84%. As in the case of Example 1, no substantial hysteresis was observed, or the characteristics did not substantially vary even after being left alone.

As described above in detail, the liquid crystal display element of the present invention entails the same advantages as those of the conventional liquid crystal display element which employs a compound containing a perfluoroalkyl group, and further exhibits an excellent film-forming ability and a high long-term stability of a phase separation state.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display element, comprising:
   a pair of substrates each having an electrode, arranged so that the electrodes face each other; and
   a liquid crystal layer sandwiched between the pair of substrates, which comprises:
   i) a liquid crystal substance which forms a liquid crystal phase, and
   ii) a non-polymeric organic compound which phase-separates from said liquid crystal phase and which forms an amorphous phase,
   wherein the transmittancy of said liquid crystal layer is controlled by changing the potential difference between said electrodes, and wherein said non-polymeric organic compound is in a glassy state.

2. The liquid crystal display element according to claim 1, wherein said non-polymeric organic compound has a glass transition temperature of 25° C. or higher.

3. The liquid crystal display element according to claim 1, wherein said non-polymeric organic compound is a steroid compound.

4. A liquid crystal display element, comprising:
   a pair of substrates each having an electrode, arranged so that the electrodes face each other; and
   a liquid crystal layer sandwiched between the pair of substrates, which comprises:

i) a liquid crystal substance which forms a liquid crystal phase, and ii) a non-polymeric organic compound which phase-separates from said liquid crystal phase which forms a network, wherein the transmittancy of said liquid crystal layer is controlled by changing the potential difference between said electrodes, and wherein said non-polymeric organic compound is in a glassy state.

5. A liquid crystal display element according to claim 4, wherein said non-polymeric organic compound has a glass transition temperature of 25° C. or higher.

6. The liquid crystal display element according to claim 4, wherein said non-polymeric organic compound is a steriod compound.

7. A liquid crystal display element, comprising:

a pair of substrates each having an electrode, arranged so that the electrodes face each other; and a liquid crystal layer sandwiched between the pair of substrates, which comprises:
  i) a liquid crystal substance which forms a liquid crystal phase, and
  ii) a non-polymeric organic compound being phase-separated from said liquid crystal phase and which forms an amorphous network, wherein transmittancy of said liquid crystal layer is controlled by changing the potential difference between said electrodes, and wherein said non-polymeric organic compound is a gel.

8. The liquid crystal display element according to claim 7, wherein said non-polymeric organic compound has a glass transition temperature of 25° C. or higher.

9. The liquid crystal display element according to claim 7, wherein said non-polymeric organic compound is an aromatic compound.

10. A liquid crystal display element, comprising:

a pair of substrates each having an electrode, arranged so that the electrodes face each other; and a liquid crystal layer sandwiched between the pair of substrates, which comprises:
  i) a liquid crystal substance which forms a liquid crystal phase, and
  ii) a non-polymeric organic compound being phase-separated from said liquid crystal phase which forms a network, wherein transmittancy of said liquid crystal layer is controlled by changing the potential difference between said electrodes, and wherein said non-polymeric organic compound is a gel.

11. The liquid crystal display element according to claim 10, wherein said non-polymeric organic compound has a glass transition temperature 25° C. or higher.

12. The liquid crystal display element according to claim 10, wherein said non-polymeric organic compound is an aromatic compound.

* * * * *